(12) United States Patent
Fan et al.

(10) Patent No.: US 10,095,403 B2
(45) Date of Patent: Oct. 9, 2018

(54) TEXT INPUT ON DEVICES WITH TOUCH SCREEN DISPLAYS

(71) Applicant: International Business Machines Corporation, Armonk, NY (US)

(72) Inventors: Si Bin Fan, Beijing (CN); Su Liu, Austin, TX (US); Jun Su, Beijing (CN); Cheng Xu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 164 days.

(21) Appl. No.: 14/704,426

(22) Filed: May 5, 2015

(65) Prior Publication Data

US 2016/0328141 A1    Nov. 10, 2016

(51) Int. Cl.
*G06F 3/0488* (2013.01)

(52) U.S. Cl.
CPC ...... *G06F 3/04883* (2013.01); *G06F 3/04886* (2013.01)

(58) Field of Classification Search
CPC .................................................. G06F 3/04886
See application file for complete search history.

(56) References Cited

U.S. PATENT DOCUMENTS

| | | | |
|---|---|---|---|
| 6,301,626 B1 | 10/2001 | Knox | |
| 6,356,866 B1 | 3/2002 | Pratley et al. | |
| 8,094,940 B2 | 1/2012 | Chen et al. | |
| 8,459,885 B2 | 6/2013 | Min | |
| 8,576,173 B2 | 11/2013 | Verhaegh | |
| 8,599,152 B1 | 12/2013 | Wurtenberger et al. | |
| 8,629,840 B2 | 1/2014 | Westerman et al. | |
| 2006/0033723 A1* | 2/2006 | Maw | G06F 3/0202 345/173 |
| 2007/0173240 A1 | 7/2007 | Lim | |
| 2010/0245230 A1 | 9/2010 | Yaun | |
| 2010/0245252 A1* | 9/2010 | Ghassabian | G06F 3/0233 345/169 |
| 2010/0333011 A1* | 12/2010 | Kornev | G06F 3/04886 715/773 |

(Continued)

FOREIGN PATENT DOCUMENTS

| | | |
|---|---|---|
| EP | 2698692 A1 | 2/2014 |
| JP | 5362061 B2 | 9/2013 |

(Continued)

OTHER PUBLICATIONS

Day et al., "Text Input using Circular Touch Pads", An IP.com Prior Art Database Technical Disclosure, IP.com No. 000048520, IP.com Electronic Publication: Feb. 8, 2005, 6 pages, <http://ip.com/IPCOM/000048520>.

(Continued)

*Primary Examiner* — Gene W Lee
(74) *Attorney, Agent, or Firm* — Bryan D. Wells

(57) ABSTRACT

Embodiments of the present invention allow a user to input text on electronic devices with touch-sensitive surfaces without physical or virtual keyboards. In operation, a user may touch a certain position on a border of the touch-sensitive surface. A position corresponding to the detected touch is determined from among a plurality of predefined positions distributed along the border. In response, a character associated with the determined position is determined and input into the device.

15 Claims, 5 Drawing Sheets

(56) References Cited

U.S. PATENT DOCUMENTS

| | | | |
|---|---|---|---|
| 2011/0128235 A1* | 6/2011 | Rogers | G06F 3/04883 345/173 |
| 2012/0019446 A1 | 1/2012 | Wu et al. | |
| 2012/0044175 A1 | 2/2012 | Cho | |
| 2012/0137244 A1* | 5/2012 | Chu | G06F 3/04886 715/773 |
| 2012/0306769 A1 | 12/2012 | Zhu et al. | |
| 2013/0009881 A1 | 1/2013 | Paul | |
| 2013/0107674 A1 | 5/2013 | Gossweiler, III et al. | |
| 2013/0154928 A1 | 6/2013 | Chang | |
| 2013/0201155 A1 | 8/2013 | Wu et al. | |
| 2013/0300667 A1 | 11/2013 | Linegar et al. | |
| 2014/0009427 A1 | 1/2014 | Kang | |
| 2014/0157182 A1* | 6/2014 | Kim | G06F 3/04883 715/780 |
| 2014/0215410 A1* | 7/2014 | Fleizach | G06F 3/017 715/863 |
| 2014/0365966 A1 | 12/2014 | Deng et al. | |
| 2016/0026358 A1* | 1/2016 | Stewart | G06F 3/14 715/781 |
| 2016/0259464 A1* | 9/2016 | Chan | G06F 1/163 |

FOREIGN PATENT DOCUMENTS

| | | |
|---|---|---|
| WO | 2010066023 A1 | 6/2010 |
| WO | 2011113057 A1 | 9/2011 |
| WO | 2013135208 A1 | 9/2013 |
| WO | 2013189290 A1 | 12/2013 |

OTHER PUBLICATIONS

"Four-Corner Method", From Wikipedia, the free encyclopedia, downloaded on Apr. 22, 2015, 1 page, <http://en.wikipedia.org/wiki/FOUR-CORNER_METHOD>.

"Method of hover assistance text entry on touched based input devices", An IP.com Prior Art Database Technical Disclosure, IP.com No. 000215470, IP.com Electronic Publication: Mar. 1, 2012, 3 pages, <http://ip.com/IPCOM/000215470>.

Oney et al., "ZoomBoard: A Diminutive QWERTY Soft Keyboard Using Iterative Zooming for Ultra-Small Devices", CHI 2013, Apr. 27-May 2, 2013, 4 pages, <http://www.cs.cmu.edu/~jwwiese/publications/zoomboard.pdf>.

* cited by examiner

TEXT INPUT ON DEVICES WITH TOUCH SCREEN DISPLAYS

BACKGROUND

As electronic devices become more compact, and the number of functions performed by a given device increases, it has become a significant challenge to design a user interface (UI) allowing users to easily interact with a multifunction electronic device. The challenge is particularly significant for portable devices such as handheld or wearable devices which have much smaller screens than desktop or laptop computers. This situation is unfortunate because the user interface is the gateway through which users receive content and responses from a device and input data or information to access the features, tools and functions of the devices.

Lots of electronic devices have been equipped with touch-sensitive displays (also known as a "touch screen displays") through which the users can directly interact with the devices using their fingers or other interaction tools like a stylus. At present, such electronic devices usually provide virtual keypads or keyboards (for example, virtual QWERTY keyboards) to allow the users to input text. In order to improve the efficiency of text input, some portable devices have resorted to adding more physical buttons or overloading the functions of physical buttons. It is also known that some devices with touch screen displays enable the users to attach conventional, physical keypads or keyboards to input text.

SUMMARY

In one aspect, a computer-implemented method is disclosed. According to the method, a touch performed by a user on a touch-sensitive surface of an electronic device is detected. Then a position corresponding to the touch is determined from among a plurality of predefined positions distributed along a border of the touch-sensitive surface. A character(s) associated with the determined position is then determined to be input to the electronic device.

In another aspect, an electronic device is disclosed. The electronic device includes a touch-sensitive surface and one or more processing units. The one or more processing units are configured to detect a touch performed by a user on the touch-sensitive surface of the electronic device. The one or more processing units are further configured to determine a position corresponding to the touch from among a plurality of predefined positions distributed along a border of the touch-sensitive surface, and then determine a character(s) associated with the determined position to be input to the electronic device.

In yet another embodiment, a computer program product is disclosed. The computer program product is tangibly stored on a computer machine readable medium and comprises executable instructions which, when executed on an electronic device, cause the electronic device to detect a touch performed by a user on the touch-sensitive surface of the electronic device, determine a position corresponding to the detected touch from among a plurality of predefined positions distributed along a border of the touch-sensitive surface, and determine a character associated with the determined position to be input to the electronic device.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar element.

DETAILED DESCRIPTION

Principle of the present invention will now be described with reference to some example embodiments. It is to be understood that these embodiments are described only for the purpose of illustration and help those skilled in the art to understand and implement the present invention, without suggesting any limitation as to the scope of the invention. The invention described herein can be implemented in various manners other than the ones described below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
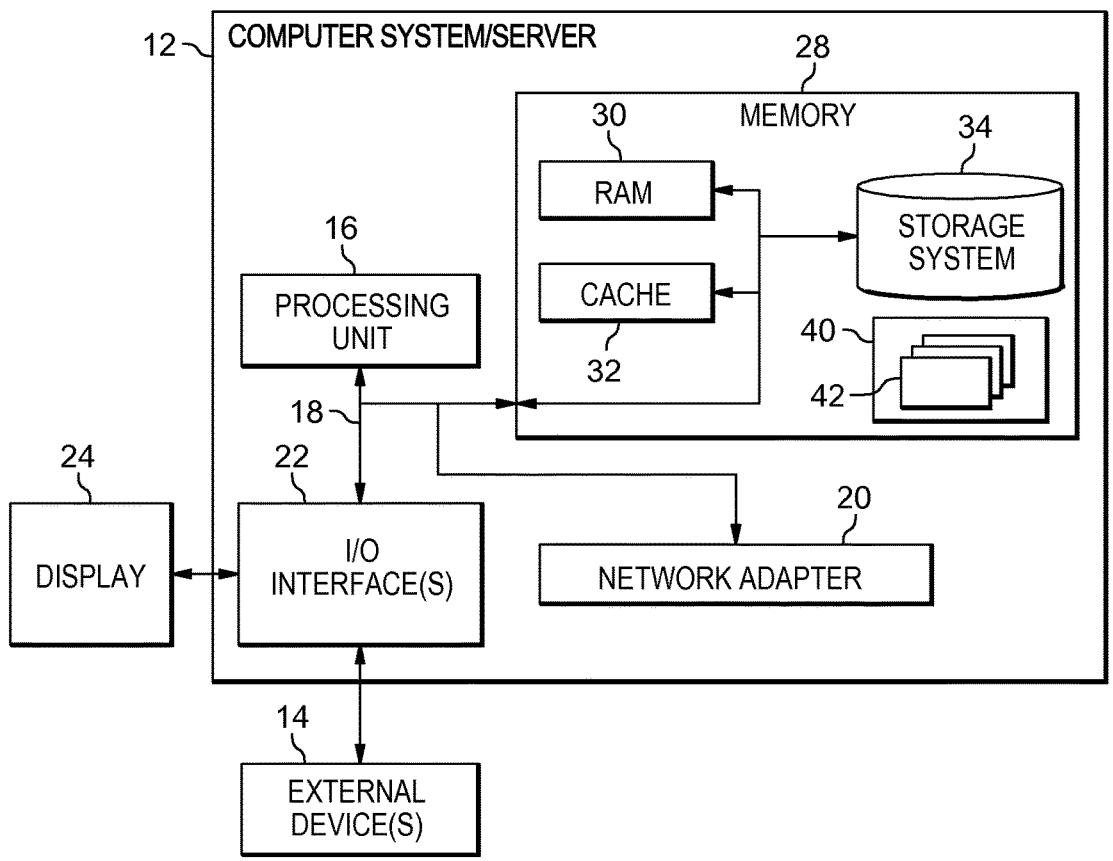
FIG. 1 is a block diagram of an electronic device in which embodiments of the present invention can be implemented.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processor(s) or processing unit(s) 16, a system memory 28, and a bus 18 that couples various system components including system memory 28 to processing unit(s) 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, data archival storage systems, etc.

Computer system/server 12 may be a mobile device in one embodiment. Examples include, but not limited to, mobile phones, laptop computers, handheld computing devices, tablet computers, personal digital assistances (PDAs), wearable devices like electronic glasses and watches, and the like. In other embodiments, the computer system/server 12 may be a fixed device like a personal computer (PC) or any suitable digital appliance capable of sensing and processing light signals, no matter currently known or developed in the future. Although some embodiments will be discussed with reference to a mobile electronic device in the following, this is only for the purpose of illustration without suggesting any limitation as to scope of use or functionality of the present invention.

In computer system/server 12, I/O interfaces 22 may support one or more of various different input devices that can be used to provide input to computer system/server 12. For example, the input device(s) may include a user device such keyboard, keypad, touch pad, trackball, etc. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Specifically, display 24 in computer system/server 12 may include a touch screen display. The touch screen display at least includes a touch-sensitive surface that accepts input from a user based on haptic and/or tactile contact. The touch screen display, along with any associated modules and/or sets of instructions in memory 28, detects contact and any movement or breaking of the contact on display 24 and converts the detected contact into interaction with user-interface objects (for example, one or more soft keys, icons, web pages or images) displayed on the touch screen display. In one embodiment, a point of contact between a touch screen display and the user corresponds to the user's finger or an interaction tool such as a stylus.

A touch screen display may use LCD (liquid crystal display) technology, or LPD (light emitting polymer display) technology, whereas other display technologies may be used in other embodiments. A touch screen display may detect contact and any movement or breaking thereof using any of a plurality of touch sensing technologies either currently known or later developed, including, but not limited to, capacitive, resistive, infrared, and surface acoustic wave technologies, as well as other proximity sensor arrays or other elements for determining one or more points of contact with the touch screen display.

In the context of the present disclosure, the touch screen display includes a proximity screen display. In operation, a user may interact with the device by placing his/her finger(s) near the screen without touching it. Moreover, in some embodiments, the touch screen display may even be separated from the electronic device. For example, the touch screen display may be an interactive visual display embodied on any suitable certain medium (for example, electronic material, skin, air, glass, and the like) to control one or more objects of the device.

The user may make contact with the touch-sensitive display using any suitable object or appendage, such as a stylus, a finger, and so forth. For example, in some embodiments, the user interface is designed to work primarily with finger-based touches and gestures. The device may translate the rough finger-based input into a precise pointer/cursor position or command for performing the actions desired by the user. It is to be understood that in the context of the present disclosure, a touch by the user does not necessarily mean a physical contact. For example, for a device equipped with a proximity screen display as described above, a user can only put his/her finger(s) near the display to realize the interaction with the device.

In some embodiments, in addition to the touch screen, computer system/server 12 may include a touchpad (not shown) for activating or deactivating particular functions. In some embodiments, the touchpad may be a touch-sensitive area of the device that, unlike the touch screen, does not display visual output. The touchpad may be a touch-sensitive surface that is separate from display 24 or an extension of the touch-sensitive surface formed by display 24. In the context of the present disclosure, a touch-sensitive surface may be a part of the touch screen display and/or the touch panel(s) of the electronic device.

Figure 2:
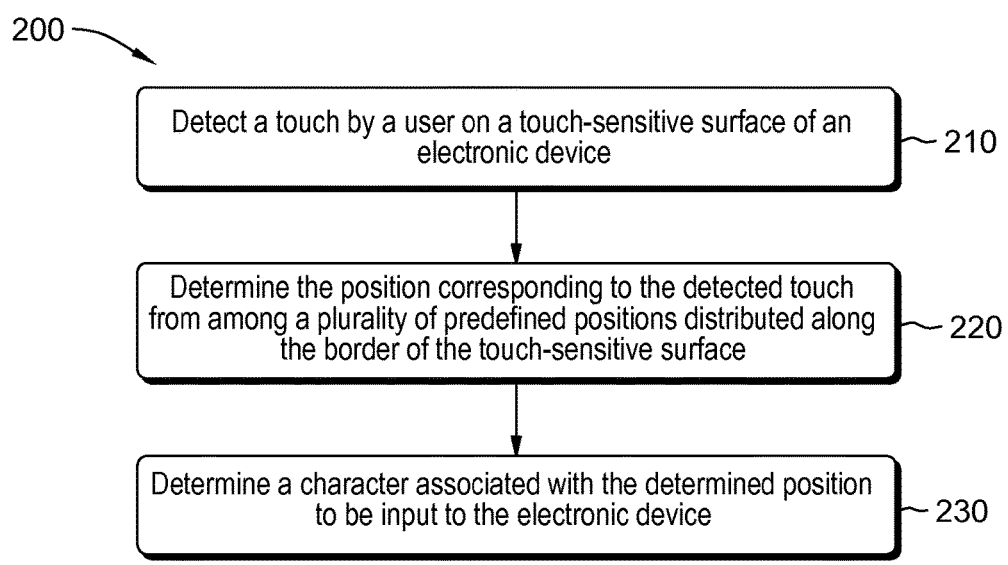
FIG. 2 is a flow chart depicting operational steps of a method for text input on electronic devices with touch screen displays in accordance with embodiments of the present invention.

FIG. 2 shows operational steps of a method 200 for text input on devices with touch screen displays in accordance with embodiments of the present invention. In general, in accordance with embodiments of the present invention, the text input may be done based on one or more touch positions with respect to at least a part of the touch screen display, without reliance on any virtual or physical keyboard or keypad.

As shown, the method 200 is entered in step 210, where a user's touch is detected on a touch-sensitive surface of an electronic device, such as computer system/server 12 as shown in FIG. 1. In operation, the user may perform a touch by his/her fingers and/or any suitable tool like a stylus, as described above. The touch-sensitive surface accepts input from the user based on haptic and/or tactile contact. The detected contact may be converted into a touch event, for example, by the processing unit(s) in combination with the display system of the electronic device. The user may perform a touch by making contact with the touch-sensitive surface. Alternatively, the user may only move his/her finger or a tool close to the touch-sensitive surface without a real contact.

Upon detection of the user's touch, the method 200 proceeds to step 220 where a position corresponding to the touch as detected in step 210 is determined from among a plurality of predefined positions. In accordance with embodiments of the present invention, the plurality of predefined positions are distributed along a border of a predefined region of the touch-sensitive surface. Such predefined region is used for the text input. For the sake of discussion, this predefined region is referred to as "text input region" in the following description.

In accordance with embodiments of the present invention, the text input region may be of any size. In one embodiment, the text input region may be the entire display area of the touch-sensitive surface, for example. It would be appreciated that in such embodiments, the predefined positions are distributed along the border of the touch-sensitive surface. Alternatively, in another embodiment, the text input region may be a sub-region of the touch-sensitive surface. Moreover, in accordance with embodiments of the present invention, the text input region may be of any suitable shape, including, but not limited to a circle, an ellipse, a rectangle, a polygon, or any other regular or irregular shape.

In some embodiments, a graphical representation of the border of the text input region may be displayed to facilitate the user's operation. In other words, the text input region may be explicitly rendered on the display of the electronic device. In this way, the user may have a more intuitive sense where the text input region is located. For the sake of discussion, in the following description, the border of text input region and its graphical representation can be used interchangeably. Of course, it is to be understood that the graphical representation of the text input region is not necessarily displayed. For example, in one embodiment where the device is an electronic watch, the whole touch-sensitive dial may function as the text input region, for example. In this event, it is unnecessary to display the graphical representation of the text input region.

In accordance with embodiments of the present invention, the text input region has a plurality of predefined positions. These positions may be defined in advance, for example, by a user, or as a default. Alternatively or additionally, one or more of those positions can be defined or modified by the user. One or more of those positions are associated with respective one or more candidate characters and thus can be used for text input. Other positions, when touched by the user, enable the user to configure the function setting of the text input on the electronic device. Example embodiments will be discussed in detail in the following paragraphs.

The predefined positions may be distributed in the text input region in any suitable way. As described above, in some embodiments, one or more of these positions may be arranged along the border of the touch-sensitive surface. That is, these positions are located at or near the border of the touch-sensitive surface. In such embodiments, the characters may be input depending on the position of the user's touch with respect to the border of the touch-sensitive surface. Alternatively or additionally, in other embodiments, one or more positions may be arranged inside or outside the text input region.

In one embodiment, it is possible to display one or more indications of at least some positions of the text input region. In this way, the user may have a more intuitive sense of the positions so that he/she can touch the desired positions accurately in operation. For example, in those embodiments where the graphical representation of the text input region is displayed, the position indications may be displayed on the graphical representation. It is also possible to only display the position indications without rendering a graphical representation of the text input region. Referring to a watch device again, the position indications may be directly displayed along the physical border of the touch-sensitive surface, for example.

Figure 3A:
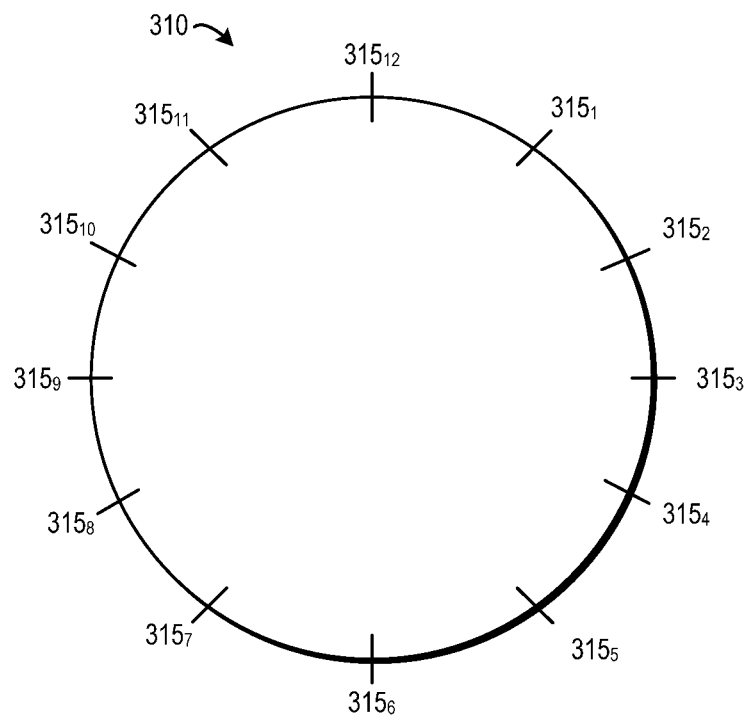
FIGS. 3A-3B are schematic diagrams of graphical representations of a border of a text input regions on a touch screen display in accordance with embodiments of the present invention.

By way of example, FIG. 3A shows an example of the graphical representation 310 of a text input region. As shown, the shape of the graphical representation 310 in this example is a circle. In the shown example, the predefined positions for text input and/or function setting are located along the border of the graphical representation 310. The positions have their respective indications $315_1$, $315_2$, ..., $315_{12}$. In this example, the graphical representation 310 of the text input region can be considered as an analog "clock" displayed on the electronic device, and the user may input characters by touching respective positions on the border of the clock. As described above, the text input region may be the entire touch-sensitive surface of the watch. That is, the positions are distributed along the device border. In this way, the users do not have to locate the keys of small size on the virtual keyboard, but only need to touch the border of the touch-sensitive surface to easily input text.

It is to be understood that although some embodiment will be described with reference to the graphical representation 310 shown in FIG. 3A, this is only for the purpose of illustration without suggesting any limitation as to the scope of the present invention. As discussed above, the graphical representation of the border of the text input region may be of any size and shape and may be displayed at any suitable location on the display. In one embodiment, the size, shape and display location of the graphical representation 310 may be configured by the user. Moreover, although the indications $315_1$, $315_2$, ..., $315_{12}$ are evenly distributed on the border of the graphical representation 310 in FIG. 3A, the scope of the present invention is not limited in this regard. Any suitable distribution of the predefined positions is possible.

Figure 3B:
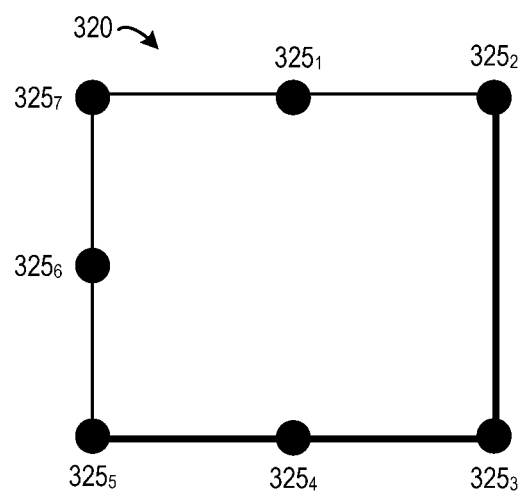

FIG. 3B shows another example graphical representation 320 of the border of a text input region. In the example shown in FIG. 3B, the shape factor and size of the text input region as well as the number, locations and indications of the predefined positions are different from those of the text input region shown in FIG. 3A. For example, in the graphical representation 320, the text input region is a rectangle, and the position locations $325_1$, $325_2$, ..., $325_7$ are indicated by solid circles.

Moreover, it is to be understood that the graphical representation of the border of the touch-sensitive surface is not necessary to display. For example, on the electronic watches or similar devices, user can easily locate and touch any desired positions distributed along the physical border of the touch-sensitive surface.

Still with reference to FIG. 2, in step 220, it is possible to select, from the plurality of predefined positions distributed on the border of the touch-sensitive surface, a closest position to the user's touch. That is, the predefined position having the shortest distance to the user's touch may be determined. If the distances from user's touch to more than two predefined positions are essentially equal, in one embodiment, the electronic device may ask the user to perform the touch gesture again so that a unique predefined position can be determined, for example. In another embodiment, one of the predefined positions having equal distances to the user's touch may be selected. To this end, in one embodiment, the predictive or guessing typing technologies may be used to make such selection. That is, one or more previous characters input by the user may be taken into consideration. For example, if each character associated with a predefined position fails to match the previously input character (for example, they cannot make a meaningful word), this position may be excluded from being selected. The predictive typing is well known and thus will not be detailed herein. Any other tie-breaker rules such as random selections can be used as well.

The method 200 then proceeds to step 230 where the text is input into the electronic device based on the position determined in step 220. More specifically, a character(s) associated with the determined touch position is determined and input into the electronic device.

As described above, at least some of the predefined positions are associated with their respective one or more candidate characters. Examples of the candidate characters include, but are not limited to, alphanumeric characters such as Latin letters, Cyrillic letters, Greek letters and Arabic numerals, symbols, emoticons, punctuations, and the like.

It is to be understood that embodiments of the present invention allow the users to input characters of a plurality of languages. Accordingly, in one embodiment, the text input region may have a plurality of "layers" each of which corresponds to a certain language. In one embodiment, these layers may have different layouts. For example, the distribution of the predefined positions and the candidate characters associated with the positions may vary for different layers. Different layers may be switched by the user in any suitable ways, for example, by means of gestures and/or a UI control like a button.

Figure 4:
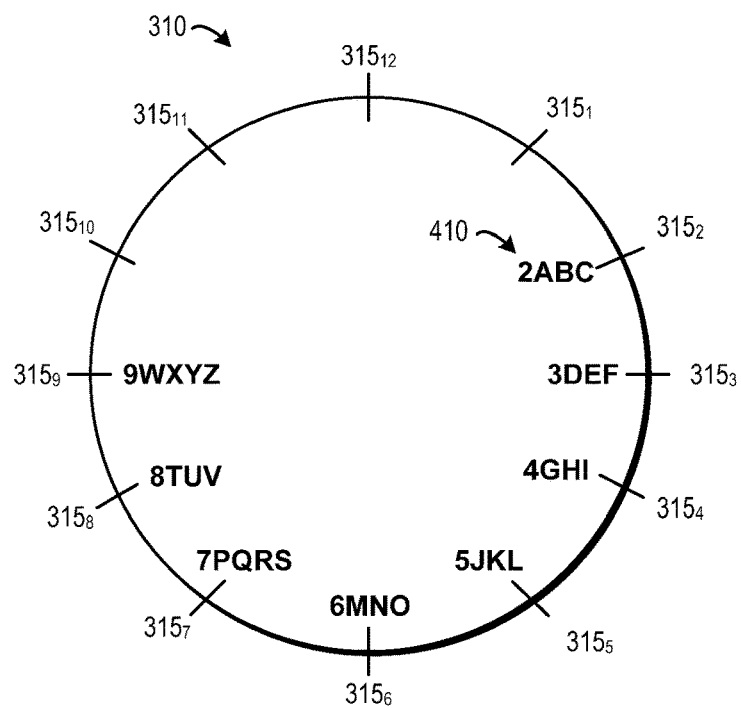
FIG. 4 is a schematic diagram of a graphical representation of a border of a text input region on a touch screen display in accordance with embodiments of the present invention, where one or more candidate characters associated with some positions are displayed.

In one embodiment, in order to facilitate the user's operation, the candidate characters may be displayed, for example, in the proximity of the associated positions. By way of example, as shown in FIG. 4, the candidate characters (numerical digits and Latin letters in this example) associated with the predefined positions $315_2$ ... $315_9$ are displayed. Only for the purpose of illustration, in this embodiment, a label 410 is used to display the associated characters associated with the position $315_2$. Any other suitable controls such as lists can be used as well. In one embodiment, the candidate characters are always displayed. Alternatively, in another embodiment, the candidate characters may be displayed in response to the user's operation, depending on whether the online help function is enabled, which will be discussed later with reference to at least paragraph [0064].

In response to the touch on a predefined position, in step 230, one of the candidate characters associated with that position is selected to be input into the electronic device. Specifically, if the touched position is associated with a single candidate character, this character may be directly input. On the other hand, if the touched position is associated with two or more candidate characters, in one embodiment, the user may use a subsequent gesture(s) to select one of the candidate characters to be input.

For example, in one embodiment, the user may use a swipe gesture to select one character from among the multiple candidate characters associated with the touched position. As used herein, the term "swipe gesture" refers to a gesture representing a movement of the user's finger or the stylus in a certain direction on the touch-sensitive surface. In one embodiment, the direction of the swipe gesture is used to select the character to be input.

By way of example, it is supposed that the touched position is associated with four characters. Then the electronic device may enable the user to use swipe gestures in four different directions to select those candidate characters, respectively. That is, after the position is determined according to the user's touch, one of the four associated candidate characters will be determined and input into the electronic device according to the direction of the user's swipe gesture after the touch.

Only for the purpose of illustration, in FIGS. 3A and 4, the position $315_2$ is associated with four candidate characters, namely, "2," "A," "B" and "C." In one embodiment, the electronic device or the user may specify that a left-to-right swipe corresponds to the candidate character "2," a right-to-left swipe corresponds to the candidate character "A," an upward swipe corresponds to the candidate character "B," and a downward swipe corresponds to the candidate character "C." Accordingly, if the user performs a left-to-right swipe after touching the position $315_2$, the candidate character "2" will be input. If the user performs a right-to-left swipe after touching the position $315_2$, then the character "A" will be input. If the user performs an upward swipe after touching the position $315_2$, then the character "B" will be input. If the user performs a downward swipe after touching the position $315_2$, then the character "C" will be input.

In this way, embodiments of the present invention allow the users to input text in a more efficient and effective way. Due to the limited display area of conventional virtual keyboards, especially on those devices with tiny displays, the text input can be a bottleneck for the user interaction. Since the size of a virtual keyboard is usually limited, the precision of the key selections can be relatively low, especially when the users are moving. In addition, it is hard to support touch typing using the virtual keyboards. It typically means that the users have to rely on hand-eye coordination in the text input. Moreover, due to the limited display area, a virtual keyboard often occupies a significant part of the screen and thus may overlay over an active application executing on the electronic device, which can impact the user experience.

In accordance with embodiments of the present invention, the user can use a simple combination of gestures (for example, touch and swipe) to input text into the electronic device. For example, the user can touch a predefined position of the text input region and then easily select a character associated with the touched position by a swipe gesture in a certain direction. As a result, the complexity and burden of the user interaction can be reduced. In some embodiments, as described above, the text input region may be implemented as a 12-hour clock face in a traditional analog watch. Compared with the virtual keyboard where the user has to precisely press the desired keys, embodiments of the present invention allow the user to use simple gestures to input text in an intuitive and robust way. As a result, the precision, fault tolerance and efficiency of the text input on the electronic devices with touch screen displays are improved.

It is to be understood that the above example embodiments are described only for the purpose of illustration, without suggesting any limitation as to the scope of the present invention. For example, in alternative embodiments, the swipe gestures in any suitable directions other than the ones described above may be used to complete the character input. In fact, in one embodiment, the electronic device may allow the user to configure the associations between the swipe directions and the candidate characters. Furthermore, in addition to or instead of the directions, in one embodiment, the user may use swipe gesture with different movement distances to make a selection among the multiple candidate characters.

It is also to be understood that the selection of candidate characters is not necessarily made using the swipe gestures. In other words, after touching a position of the text input region, the user may use another subsequent gesture(s) to select the exact character he/she wants to input. For example, in one embodiment, the user may use tap gestures to select the character he/she wants to input. By way of example, in one embodiment, if the user taps the touch-sensitive surface once within a predefined time period after touching the position, the first candidate character associated with the position will be input; if the user taps the touch-sensitive surface twice within the predefined time period after touching the position, the second candidate character associated with the position will be input; and so on.

Figure 5:
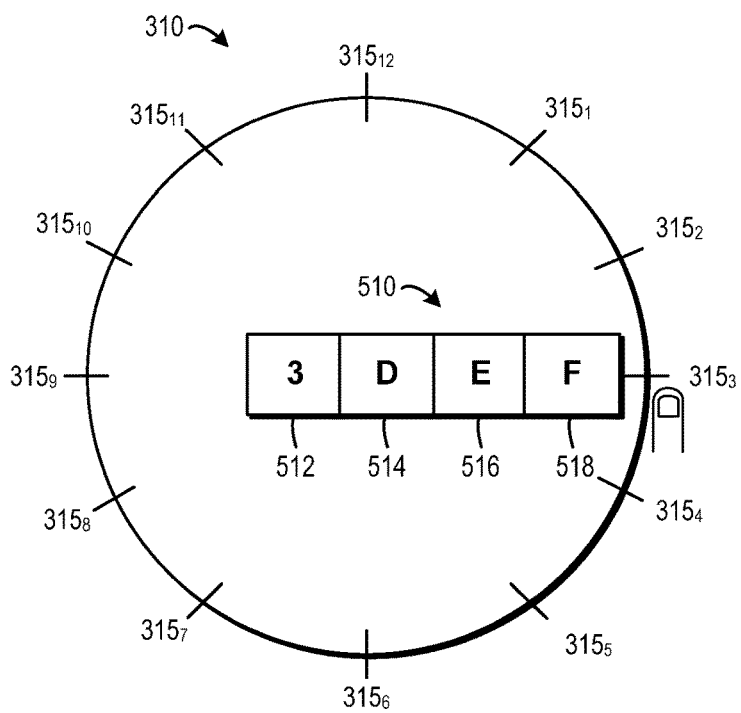
FIG. 5 is a schematic diagram of a graphical representation of a border of a text input region on a touch screen display in accordance with embodiments of the present invention, where one or more candidate characters associated with a position are displayed in a selectable way.

In yet another embodiment, responsive to the user's touch of a position, the candidate characters associated with the touched position may be displayed or enlarged for the user's selection. By way of example, FIG. 5 shows an example where the user touches the position $315_3$. In this example, after the user touches the position $315_3$, the associated candidate characters "3," "D," "E," and "F" are displayed in a list 510. Alternatively, in one embodiment, the list 510 is displayed only if the duration of the touch on the position $315_3$ exceeds a predefined duration threshold. The threshold time length may be configured by the user, for example. It is to be understood that the display location and appearance of the list 510 are merely for the purpose of illustration. Elements 512, 514, 516 and 518 in the list 510 may be implemented as buttons or other selectable controls. In this way, the user may select a candidate character by touching the corresponding element. For example, the user may input the character "D" by tapping on the element 514.

In some cases, a predefined position(s) on the border of the text input region are associated with too many candidate characters to be displayed in one shot. For example, in one embodiment, a position may be associated with dozens of punctuations or other symbols which cannot be effectively displayed in a single control like the list 510 in FIG. 5. Accordingly, in one embodiment, after touching such a position of the text input region, the user may use different subsequent gestures to trigger the display of different sets of candidate characters associated with the touched position.

Figure 6A:
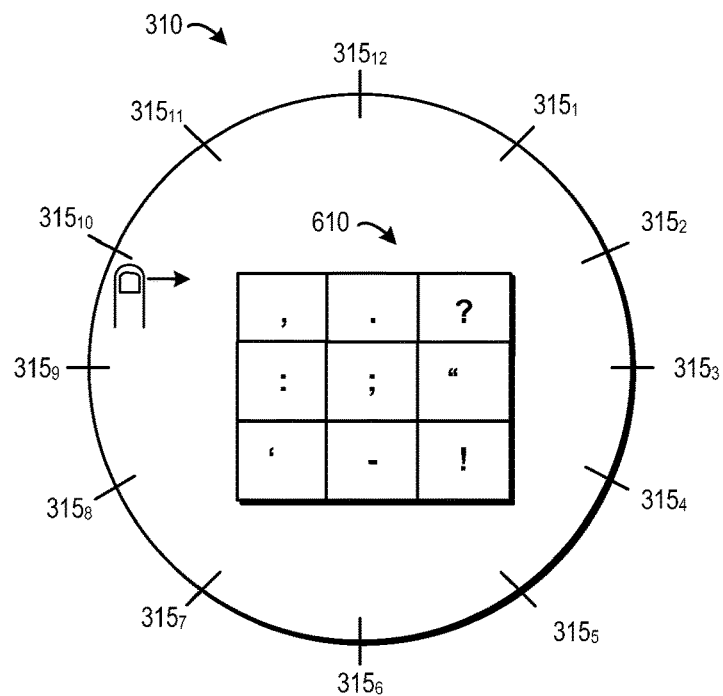
FIGS. 6A-6B are schematic diagrams of graphical representations of a border of a text input region on a touch screen display in accordance with embodiments of the present invention, where different sets of candidate characters are displayed according to a user's different gestures.
Figure 6B:
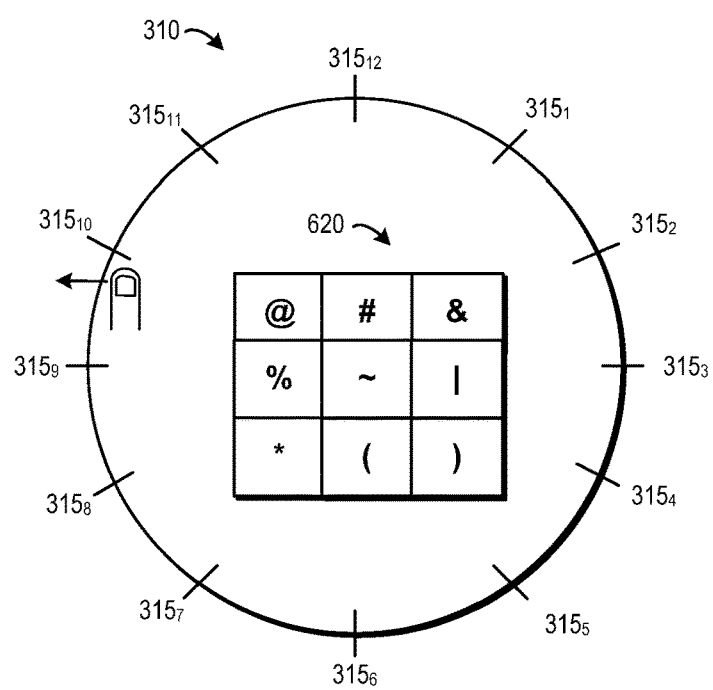

For the sake of discussions, an example will be discussed with reference to FIGS. 6A-6B. It is supposed that the position $315_{10}$ of the text input region is associated with a first set of candidate characters and a different second set of characters. In this embodiment, after the position $315_{10}$ is touched, the first set of candidate characters 610 will be displayed if the user performs a first gesture, as shown in FIG. 6A. If the user performs a second gesture which is different from the first gesture after the touch, the second set of candidate characters 620 will be displayed, as shown in FIG. 6B.

In one embodiment, the first and second gestures may be different gestures. By way of example, the first gesture may be a swipe and the second gesture may be a tap. Alternatively, in one embodiment, the first and second gestures may be the same type of gestures with different parameters. For example, the first and second gestures may be swipes in different directions. By way of example, in one embodiment, the first gesture may be a left-to-right swipe gesture while the second gesture may be a right-to-left swipe gesture. As another example, the first gesture may be a single-tap gesture while the second gesture may be a double-tap gesture.

By use of the natural swipe gesture to trigger the display of different candidate characters, the user's interaction burden can be further reduced. For example, after touching the position, the user may efficiently perform the subsequent operations without releasing his/her finger from the touch-sensitive surface. Of course, it is to be understood that the example embodiments described above are merely for the purpose of illustration, without suggesting any limitation as to the scope of the present invention. Any other suitable gestures after the touch may be used to trigger the display of different sets of candidate characters associated with the touched position. In one embodiment, such gestures may be defined or configured by the user, for example. Moreover, the candidate characters associated with the touched position may be grouped into any suitable number of character sets. For example, if there are four sets of candidate characters, then four gestures may be defined accordingly.

In some embodiments, in addition to or instead of representing the candidate characters, one or more positions of the text input region may be associated with one or more functions related to the text input. In operation, the user may set or configure these functions by touching the corresponding positions. That is, if a position touched by the user is associated with a function related to the text input, the electronic device responds by allowing the user to set or configure the corresponding function(s).

By way of example, in one embodiment, the functions related to the text input includes online help. It would be appreciated that in the embodiments described with reference to FIGS. 4 and 5, the label 410 and other labels (not shown) and the list 510 may be considered as online help prompts. By means of these prompts, the user may know which characters are associated with the touched position and possibly other relevant information. Some prompts like the label 410 in FIG. 4 may be displayed all the time. Other prompts like the list 510 may be displayed only if a position is touched by the user.

In some situations, however, some users especially those experienced users do not need the online help since they have already remembered the candidate characters associated with the positions. Therefore, in one embodiment, the user is allowed to enable/disable the online help in order to avoid the potential distraction caused by unnecessary online help. To this end, in one embodiment, the user may enable or disable the online help by touching the associated position of the text input region.

For the purpose of illustration, it is supposed that the function of online help is associated with the position $315_{11}$ in FIG. 3A. If the online help is disabled, the user may enable the online help by touching the position $315_{11}$. Then in operation, when the user touches a position of the text input region, the electronic device may display a prompt (such as the list 510 in FIG. 5) to show the candidate characters. If the user touches the position $315_{11}$ again, the online help will be disabled such that no prompt will be displayed in operation.

Figure 7:
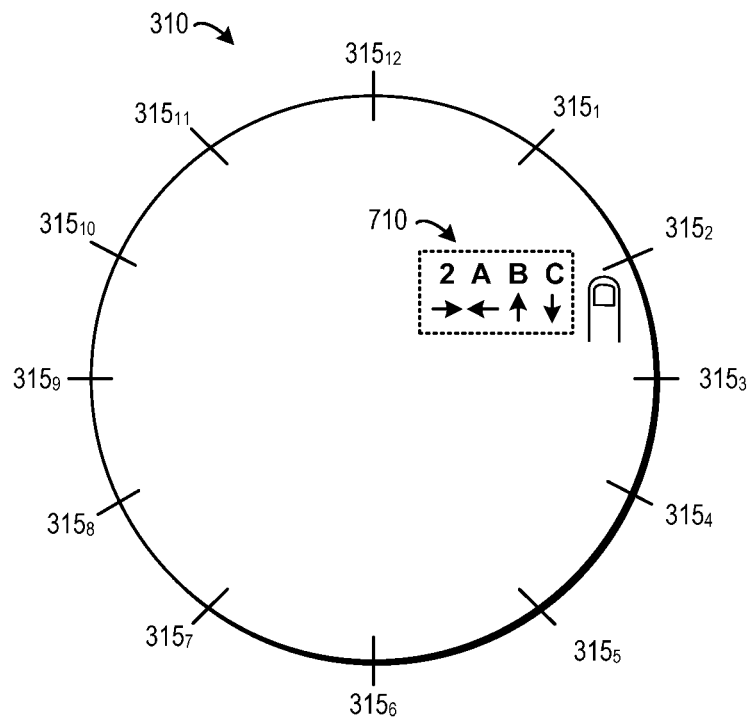
FIG. 7 is a schematic diagram of a graphical representation of a border of a text input region on a touch screen display in accordance with embodiments of the present invention, where one or more candidate characters associated with a position and one or more gestures for selecting these candidate characters are displayed.

In addition to the characters, in one embodiment, the online help prompt may provide other useful information such as the gestures that can be used to select the candidate characters. FIG. 7 shows an example embodiment in this regard. In this example, in the case that the online help is enabled, if the user touches the position $315_2$ in FIG. 3A, a prompt 710 may be displayed. Similar to the label 410 in FIG. 4, the prompt 710 shows the candidate characters associated with the touched position, namely, "2," "A," "B" and "C". The prompt 710 further shows the swipe gestures that can be used to select the respective candidate characters. In this example, these swipe gestures are represented by respective arrows of different pointing directions.

In some embodiments where the functions to be set are relatively complicated, when the user touches the associated position, a UI control such as a dialog, a pop-up window, a combo-box, a check box, a list and/or any other suitable controls may be displayed. The user may then use the control(s) to set or configure the functions. For example, in one embodiment, the user may customize the candidate characters associated to at least some positions of the text input region. That is, by use of the function control(s), the user may add, remove and/or modify one or more candidate characters associated with a predefined position(s) of the text input region.

It can be seen from FIGS. 4 to 7 that by arranging the predefined positions along the border, embodiments of the present invention take full advantage of the area of the touch-sensitive surface to display the candidate characters, gesture prompt, and/or other auxiliary information. As such, the accuracy and efficiency of user interactions can be further improved.

Figure 8:
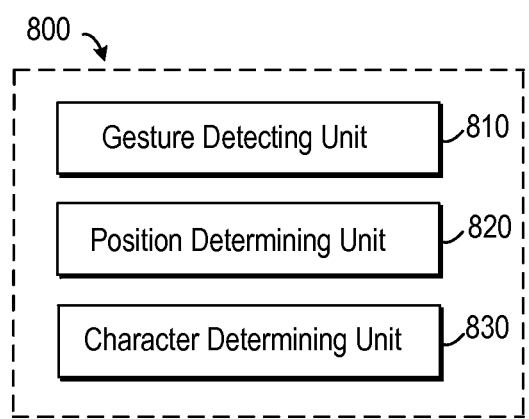
FIG. 8 is a block diagram of an apparatus for text input on electronic devices with touch screen displays in accordance with embodiments of the present invention.

As discussed above, the electronic device equipped with a touch-sensitive surface such as the computer system/server 12 shown in FIG. 1 may be configured to implement embodiments of the present invention. For example, the processing unit(s) of the device may be configured to implement the method 200. Alternatively, embodiments of the present invention may be implemented as an apparatus. FIG. 8 shows a block diagram of an apparatus for text input on electronic devices with touch screen displays in accordance with some embodiments of the present invention.

As shown, the apparatus 800 includes a gesture detecting unit 810 configured to detect a touch performed by a user on a touch-sensitive surface of an electronic device; a position determining unit 820 configured to determine a position corresponding to the detected touch from among a plurality of predefined positions, where the plurality of predefined positions are distributed along a border of the touch-sensitive surface; and a character determining unit 830 configured to determine a character associated with the determined position to be input to the electronic device.

In one embodiment, the apparatus 800 further comprises a region display unit configured to display a graphical representation of the border of the touch-sensitive surface. Additionally or alternatively, the apparatus 800 further comprises a position display unit configured to display indications of the plurality of predefined positions. In one embodiment, each of the plurality of predefined positions is associated with at least one candidate character, and the apparatus 800 further comprises a character display unit configured to display the at least one character associated with at least one of the plurality of predefined positions.

In some embodiments, the position is associated with a plurality of candidate characters. In one embodiment, the gesture detecting unit 810 is configured to detect a gesture performed by the user after the touch, and the character determining unit 830 is configured to select the character to be input from the plurality of candidate characters based on the detected gesture. More specifically, in one embodiment, the gesture detecting unit 810 is configured to detect a swipe gesture on the touch-sensitive surface, and the character determining unit 830 is configured to select the character to be input based on a direction of the detected swipe gesture. Additionally or alternatively, in one embodiment, the apparatus 800 includes a prompt display unit configured to display, responsive to the touch, the plurality of candidate characters and a prompt for a set of gestures, where each of the set of gestures is used to select one of the plurality of candidate characters.

In some embodiments, the position is associated with a first plurality of candidate characters and a second plurality of candidate characters. In one embodiment, the apparatus 800 includes: a first character display unit configured to display the first plurality of candidate characters responsive to a first gesture detected on the touch-sensitive surface after the touch; and a second character display unit configured to display the second plurality of candidate characters responsive to a second gesture detected on the touch-sensitive surface after the touch, where the second gesture is different from the first gesture. Specifically, in one embodiment, the first and second gestures are swipe gestures in different directions.

In one embodiment, the gesture detecting unit 810 is configured to detect a further touch performed by the user on the touch-sensitive surface, and the position determining unit 820 is configured to determine a further position corresponding to the further touch from among the plurality of predefined positions. In this embodiment, the apparatus 800 further includes a function setting unit configured to allow the user to set or configure a function for text input based on the determined further position of the further touch.

It should be noted that for the sake of clarity, FIG. 8 does not show optional units or sub-units included in the apparatus 800. All features and operations as described above are suitable for apparatus 800, respectively, which are therefore not detailed here. Moreover, partitioning of units or subunits in apparatus 800 is exemplary, rather than limitative, and intended to describe its main functions or operations logically. A function of one unit may be implemented by a plurality of other units. On the contrary, a plurality of units may be implemented by one unit. The scope of the present invention is not limited in this aspect.

Moreover, the units included in the apparatus 800 may be implemented by various means, including software, hardware, firmware or a combination thereof. For example, in some embodiments, the apparatus may be implemented by software and/or firmware. Alternatively or additionally, the apparatus 800 may be implemented partially or completely based on hardware. For example, one or more units in the apparatus 800 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by one or more computer processors, a first touch performed by a user on a touch-sensitive surface representing a watch face of an electronic watch;
   displaying, by one or more computer processors, a graphical representation of a border of the touch-sensitive surface;
   displaying one or more indications of twelve predefined positions, wherein the twelve predefined positions are distributed along a circular border of the touch-sensitive surface at approximately 30 degree intervals;
   determining, by one or more computer processors, a position corresponding to the detected first touch from among the twelve predefined positions;
   in response to determining, by one or more computer processors, that the position corresponding to the detected first touch represents four candidate alphanumeric characters, linearly displaying, by one or more computer processors, the four candidate alphanumeric characters, wherein no other predefined position represents the four candidate alphanumeric characters;
   detecting, by one or more computer processors, a swipe gesture on the touch-sensitive surface after the first touch;
   selecting, by one or more computer processors, an alphanumeric character from the four candidate alphanumeric characters based on a direction of the detected swipe gesture, wherein the direction of the swipe gesture in relation to the position of the first touch is independent of a direction of the selected alphanumeric character in relation to the position of the first touch;
   inputting, by one or more computer process, the selected alphanumeric character into the electronic watch;
   detecting, by one or more computer processors, a second touch performed by the user on the touch-sensitive surface of the electronic watch;
   determining, by one or more computer processors, a second position corresponding to the detected second touch from among the twelve predefined positions;
   determining, by one or more computer processors, that the second position corresponding to the detected second touch represents at least eighteen candidate punctuation characters, wherein:
   no other predefined position represents the at least eighteen candidate punctuation characters, and
   the at least eighteen candidate punctuation characters represented by the second position corresponding to the detected second touch includes a first set of nine candidate punctuation characters and a second set of nine candidate punctuation characters;
   responsive to detecting a first gesture on the touch-sensitive surface after the second touch, displaying, by one or more computer processors, the first set of nine candidate punctuation characters in a first grid including three rows and three columns; and
   responsive to detecting a second gesture on the touch-sensitive surface after the second touch, displaying, by one or more computer processors, the second set of nine candidate punctuation characters in a second grid including three rows and three columns, wherein the second gesture is different from the first gesture.

2. The method of claim 1, further comprising:
   for each predefined position that represents one or more candidate alphanumeric characters, displaying, by one or more computer processors, at least one alphanumeric character of the one or more candidate alphanumeric characters in proximity to the predefined position in order to identify the predefined position.

3. The method of claim 1, wherein the first gesture and the second gesture each are a swipe gesture in a different direction.

4. The method of claim 1, further comprising:
   detecting, by one or more computer processors, a third touch performed by the user on the touch-sensitive surface;
   determining, by one or more computer processors, a third position corresponding to the third touch from among the twelve predefined positions; and
   enabling the user to configure a function represented by the determined third position, wherein the function enables modification of the four candidate alphanumeric characters represented by the first position corresponding to the detected first touch.

5. The method of claim 4, further comprising:
   responsive to the third touch, displaying, by one or more computer processors, a prompt for a set of swipe gestures, wherein each swipe gesture of the set of swipe gestures is used to select a respective alphanumeric character of the plurality of candidate alphanumeric characters.

6. An electronic watch comprising:
   a touch-sensitive surface representing a watch face; and
   at least one processing unit configured to:
   detect a first touch performed by a user on the touch-sensitive surface;
   display a graphical representation of a border of the touch-sensitive surface;
   display one or more indications of twelve predefined positions, wherein the twelve predefined positions are distributed along a circular border of the touch-sensitive surface at approximately 30 degree intervals;

determine a position corresponding to the detected first touch from among the twelve predefined positions;

determine that the position corresponding to the detected first touch represents four candidate alphanumeric characters, and in response, linearly display the four candidate alphanumeric characters, wherein no other predefined position represents the four candidate alphanumeric characters;

detect a swipe gesture on the touch-sensitive surface after the first touch;

select an alphanumeric character from the four candidate alphanumeric characters based on a direction of the detected swipe gesture, wherein the direction of the swipe gesture in relation to the position of the first touch is independent of a direction of the selected alphanumeric character in relation to the position of the first touch;

input the selected alphanumeric character into the electronic watch;

detect a second touch performed by the user on the touch-sensitive surface of the electronic watch;

determine a second position corresponding to the detected second touch from among the twelve predefined positions;

determine that the second position corresponding to the detected second touch represents at least eighteen candidate punctuation characters, wherein:

no other predefined position represents the at least eighteen candidate punctuation characters, and the at least eighteen candidate punctuation characters represented by the second position corresponding to the detected second touch includes a first set of nine candidate punctuation characters and a second set of nine candidate punctuation characters;

display the first set of nine candidate punctuation characters in a first grid including three rows and three columns responsive to a first gesture detected on the touch-sensitive surface after the second touch; and display the second set of nine candidate punctuation characters in a second grid including three rows and three columns responsive to a second gesture detected on the touch-sensitive surface after the second touch, wherein the second gesture is different from the first gesture.

7. The electronic device of claim 6, wherein the at least one processing unit is further configured to:

for each predefined position that represents one or more candidate alphanumeric characters, cause at least one alphanumeric character of the one or more candidate alphanumeric characters to be displayed in proximity to the predefined position in order to identify the predefined position.

8. The electronic device of claim 6, wherein the first gesture and the second gesture each are a swipe gesture in a different direction.

9. The electronic device of claim 6, wherein the at least one processing unit is further configured to:

detect a third touch performed by the user on the touch-sensitive surface;

determine a further position corresponding to the third touch from among the twelve predefined positions; and enable the user to configure a function represented by the determined third position, wherein the function enables modification of the four candidate alphanumeric characters represented by the position corresponding to the detected first touch.

10. The electronic device of claim 9, wherein the at least one processing unit is further configured to:

display, responsive to the third touch, a prompt for a set of four swipe gestures, wherein each swipe gesture of the set of four swipe gestures is used to select a respective alphanumeric character of the four candidate alphanumeric characters.

11. A computer machine-readable device tangibly storing a computer program product and comprising machine-executable instructions stored thereon, the instructions, when executed on an electronic device, wherein the electronic device is an electronic watch, causing the electronic device to:

detect a first touch performed by a user on a touch-sensitive surface representing a watch face of the electronic device;

display a graphical representation of a border of the touch-sensitive surface;

display one or more indications of twelve predefined positions, wherein the twelve predefined positions are distributed along a circular border of the touch-sensitive surface at approximately 30 degree intervals;

determine a position corresponding to the detected first touch from the twelve predefined positions;

determine that the position corresponding to the detected first touch represents four candidate alphanumeric characters, and in response, linearly display the four candidate alphanumeric characters, wherein no other predefined position represents the four candidate alphanumeric characters;

detect a swipe gesture on the touch-sensitive surface after the first touch;

select an alphanumeric character from the four candidate alphanumeric characters based on a direction of the detected swipe gesture, wherein the direction of the swipe gesture in relation to the position of the first touch is independent of a direction of the selected alphanumeric character in relation to the position of the first touch;

input the selected alphanumeric character into the electronic device;

detect a second touch performed by the user on the touch-sensitive surface of the electronic device;

determine a second position corresponding to the detected second touch from among the twelve predefined positions;

determine that the second position corresponding to the detected second touch represents at least eighteen candidate punctuation characters, wherein:

no other predefined position represents the at least eighteen candidate punctuation characters, and the at least eighteen candidate punctuation characters represented by the second position corresponding to the detected second touch includes a first set of nine candidate punctuation characters and a second set of nine candidate punctuation characters;

display the first set of nine candidate punctuation characters in a first grid including three rows and three columns responsive to a first gesture detected on the touch-sensitive surface after the second touch; and display the second set of nine candidate punctuation characters in a second grid including three rows and three columns responsive to a second gesture detected on the touch-sensitive surface after the second touch, wherein the second gesture is different from the first gesture.

12. The computer machine-readable device of claim 11, the instructions, when executed on an electronic device, further causing the electronic device to:
- detect a third touch performed by the user on the touch-sensitive surface;
- determine a further position corresponding to the third touch from among the twelve predefined positions; and
- enable the user to configure a function represented by the determined third position, wherein the function enables modification of the four candidate alphanumeric characters represented by the position corresponding to the detected first touch.

13. The computer machine-readable device of claim 12 the instructions, when executed on an electronic device, further causing the electronic device to:
- display, responsive to the third touch, a prompt for a set of four swipe gestures, wherein each swipe gesture of the set of four swipe gestures is used to select a respective alphanumeric character of the four candidate alphanumeric characters.

14. The computer machine-readable device of claim 11, the instructions, when executed on an electronic device, further causing the electronic device to:
- for each predefined position that represents one or more candidate alphanumeric characters, cause at least one alphanumeric character of the one or more candidate alphanumeric characters to be displayed in proximity to the predefined position in order to identify the predefined position.

15. The computer machine-readable device of claim 11, wherein the first gesture and the second gesture each are a swipe gesture in a different direction.

* * * * *